C. C. FELLOWS.
EGG AND VEGETABLE TONGS.
No. 65,896. Patented June 18, 1867.
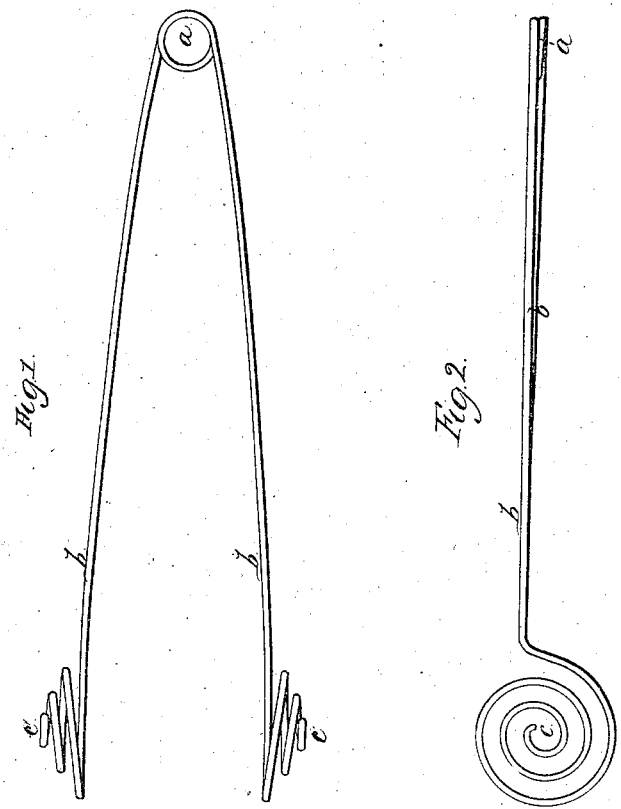

United States Patent Office.

CHRISTOPHER C. FELLOWS, OF CENTRE SANDWICH, NEW HAMPSHIRE.

Letters Patent No. 65,896, dated June 18, 1867.

---

IMPROVED VEGETABLE-LIFTER.

---

*The Schedule referred to in these Letters Patent and making part of the same.*

---

TO ALL PERSONS TO WHOM THESE PRESENTS SHALL COME:

Be it known that I, CHRISTOPHER C. FELLOWS, of Centre Sandwich, in the county of Carroll, and State of New Hampshire, have invented a new and useful or improved implement for introducing eggs or vegetables into or removing such from a kettle or vessel containing hot water; and I do hereby declare the same to be fully described in the following specification, and represented in the accompanying drawings, of which—

Figure 1 is a top view, and

Figure 2 a side elevation of it.

In constructing the said implement, I take a piece of wire of sufficient length and diameter, and bend it at its middle one full helical coil as shown at $a$, so that the two halves of the wire may readily spring apart from one another after compression of them together. Next I bend each half or portion $b$ of the wire in a conical helix or spiral, as shown at $c\ c$, this completing the implement. The concavo-convex spirals thus formed on the two parts of the wire serve as jaws to grasp an egg, potato, or other article in order to place it within a vessel of hot water or remove it therefrom.

The mode of using the said implement will be apparent on inspection of it.

I am aware of the plate-lifter made in one piece of wire, by Daniel M. Skinner, and for which he has applied or is about to apply for Letters Patent. I do not claim such as my invention, it not being adapted for the use or purposes for which my invention is to be employed. Neither could my said invention or implement be used for the object or purpose for which his invention is specially designed.

I make no claim to the invention described and represented in the United States Patent No. 27,802, the same consisting in a double ladle, a tongue and eye, two springs, a handle and a fork, the same, with the exception of the handle, being formed of two separate pieces of wire, for in carrying out my invention I employ but one piece of wire, and have one spring $a$ common to the two legs $b\ b$, and therefore—

I claim as my invention the new manufacture of egg or vegetable-lifter, made as hereinbefore described, viz, from one piece of wire bent at its middle, and also bent at or near its two ends in conical spirals or helices, as set forth.

CHRISTOPHER C. FELLOWS.

Witnesses:
F. P. HALE, Jr.,
GEO. H. ANDREWS.